Jan. 7, 1941.  P. F. SPERRY  2,228,092
SPROCKET MECHANISM FOR PROJECTORS AND THE LIKE
Filed July 15, 1939
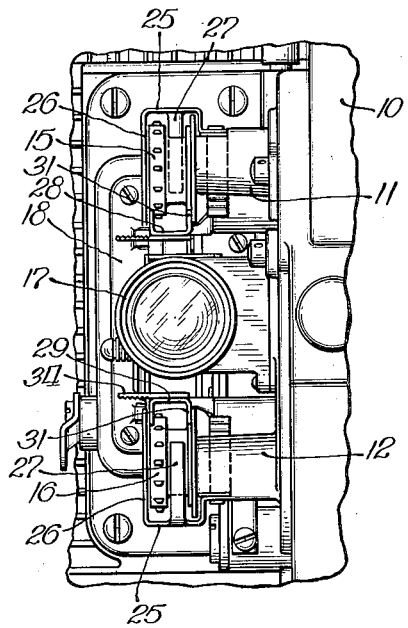
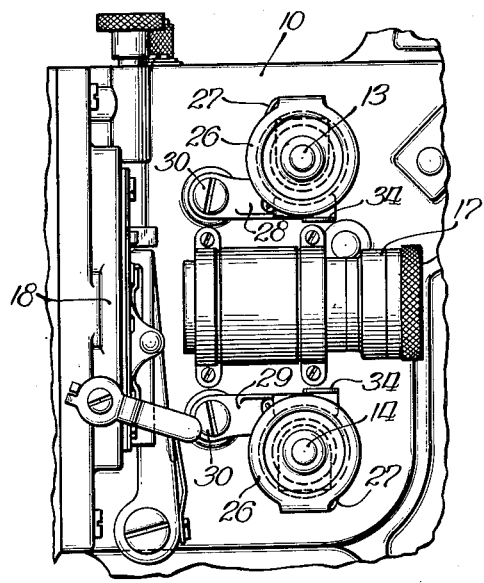
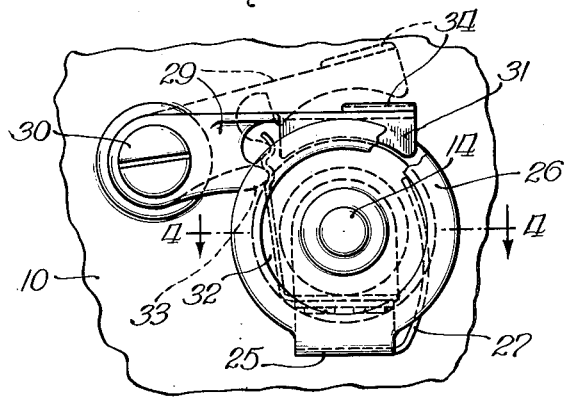
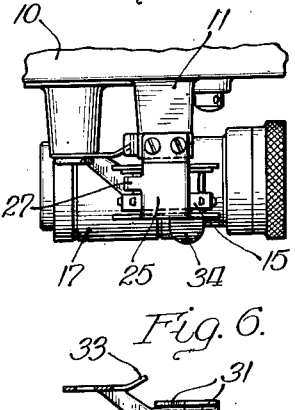
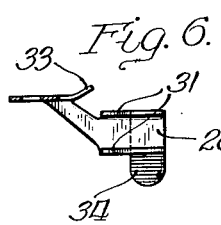
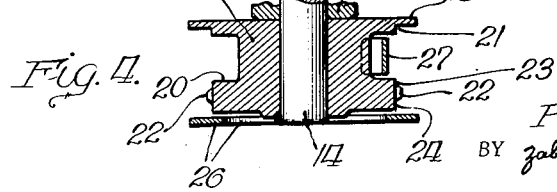
INVENTOR.
Philmore F. Sperry
BY Zabel, Carlson, Gritzbaugh & Wells
ATTORNEYS.

Patented Jan. 7, 1941

2,228,092

UNITED STATES PATENT OFFICE 2,228,092

SPROCKET MECHANISM FOR PROJECTORS AND THE LIKE

Philmore F. Sperry, Chicago, Ill., assignor to Revere Camera Company, Chicago, Ill., a corporation of Delaware Application July 15, 1939, Serial No. 284,610

3 Claims. (Cl. 271—2.3)

This invention relates to sprocket mechanisms for use in projectors or cameras, or other arrangements in which perforated film strips are moved in critical timed relation to other parts, and it has for its object the provision of a new and improved form and arrangement of parts by reason of which the mechanisms may be more readily and cheaply produced, the operation may be more easily controlled for threading a film into operative position in a projector or other machine and for the release of the film from operative position, the action of the control parts shall be more positive so as to prevent slippage of the film, the wear on the film and the controlling parts may be cut down to a minimum, and the action of the parts in general shall be improved.

This invention comprises further an improved form of presser devices for holding a film in engagement with the sprocket, together with an improved arrangement of resilient arm for holding the presser member in operative position. In the arrangement shown, a spring arm is provided adapted to hold this presser member releasably either in its operative position or in an alternative position removed slightly from the sprocket.

It is another object of this invention to improve devices of this type in sundry details hereinafter pointed out. The preferred means by which the several objects have been accomplished are illustrated in the drawing and are hereinafter specifically described. That which is believed to be new is set forth in the claims.

In the drawing—

Fig. 1 is a front face view of a fragmentary portion of a projector showing the arrangement of the sprocket mechanism;

Fig. 2 is a side face view of the parts shown in Fig. 1 as seen from the left in said Fig. 1;

Fig. 3 is an enlarged view of the lower sprocket mechanism as seen in Fig. 2;

Fig. 4 is a horizontal sectional view taken substantially at the line 4—4 of Fig. 3;

Fig. 5 is a top plan view of a portion of the parts as shown in Fig. 2; and

Fig. 6 is a top plan view of one of the pressing devices removed from the remaining parts.

Referring now to the several figures of the drawing, in which corresponding parts are indicated by the same reference characters, 10 indicates the casing of a projector comprising the framework upon which the improved sprocket mechanism is mounted. In the arrangement shown, lugs 11 and 12 are provided extending outwardly from the face of the frame member 10 having shafts 13 and 14 rotatably mounted therein, said shafts being provided with sprocket wheels 15 and 16 fixedly mounted thereon so as to be rotated thereby. As is shown in Figs. 1 and 2, the lugs 11 and 12 are positioned in spaced relation to each other with a lens housing 17 of any approved type mounted between the lugs, such lens housing 17 being positioned directly in front of a gate mechanism 18 of any approved type by which a film is held in position for the projection of a ray of light therethrough as is well understood in the art.

In the arrangement shown, each of the sprocket wheels is in the form of a block of metal of generally cylindrical form having a flange 19 at one end face, with a circumferential groove 20 about the sprocket wheel adjacent to the flange 19 but leaving a narrow face portion 21 between the flange and the groove. At its opposite end portion, the sprocket wheel is provided with a plurality of outwardly extending teeth 22 in equally spaced relation to each other about the wheel, such teeth 22 being so positioned as to leave a narrow shoulder portion 23 between the teeth and the groove 20 and a narrow shoulder portion 24 between the teeth and the adjacent end of the sprocket wheel. In order to facilitate the machining operations by which the teeth 22 are cut in integral form upon the sprocket wheel, the wheel is formed without a flange at the end portion adjacent to the teeth 22. By reason of the omission of the flange at the end face of the sprocket wheel, the grooves or openings between the teeth may be carried clear to the end of the wheel so as to open at the end face whereby the operation of forming the teeth is very greatly simplified and expedited as compared with the operation where a flange must be maintained closely adjacent to the teeth being cut.

For preventing transverse movement of a film toward the left in Fig. 1 out of operative engagement with the teeth 22 of the sprocket wheels, retainer devices have been employed in the form of brackets 25, each of said brackets comprising a ring portion 26 positioned opposite to the outer end of the sprocket wheel. The bracket 25 and integrally attached ring 26 serve not only for preventing transverse movement of a film but serve also as the support for an integrally formed arm 27 which extends into the groove 20 of the wheel for stripping the film from the teeth of the sprocket wheel as the wheel rotates.

For pressing the film into engagement with the teeth of the sprocket wheels, arms 28 and 29 are pivotally mounted on the frame member 10 by means of machine screws 30, as is best shown in Fig. 2, such arms being adapted to swing to and from the sprocket wheels 15 and 16 respectively about their pivotal supporting means. As is clearly shown in Fig. 1, each of the arms 28 and 29 is in the form of an inwardly open channel the flanges 31 of which are arranged to apply pressure on the shoulder portions 21 and 24 of the sprocket wheels. As is best shown in Fig. 3, the flanges 31 are shaped at their edges to conform with the curvature of the sprocket wheel so that such flanges are adapted to press the side edge portions of a film against the sprocket wheel so as to hold the film in operative engagement with the teeth 22.

For holding the arms 28 and 29 alternatively in either their operative position as shown in solid lines in Fig. 3 or in their inoperative position as shown in dotted lines in said figure, a latching device 32 is provided, such latching device in the arrangement shown being in the form of a spring adapted to have releasable latching engagement with a lug 33 carried by the arm. The arrangement is such that the lug 33 is adapted to have a free camming movement from one latched position to another so that the member 32 serves effectively for holding the arm 29 either in the position as shown in solid lines in Fig. 3 or in the position as shown in dotted lines in said figure. While the spring latch 32 and its cooperating means causes the arm to press the film against the sprocket wheel, at the same time such latch serves to hold the arm yieldingly from applying too great pressure on the film. The arrangement is such, with the engaging notches of the spring 32 comparatively large, that the spring by engagement with the rounded lug 33 tends to move the arm through a fairly large angular stroke into the normal centered position as shown in Fig. 3. For moving the arms 28 and 29 away from the sprocket wheels, lugs 34 are provided thereon, the arrangement being such that when the lugs 34 of the two arms 28 and 29 are pressed toward each other the arms are moved out of their operative positions.

While the form and arrangement of parts as shown in the drawing and as above described are preferred, the invention is not to be limited to such form and arrangement except so far as the claims may be so limited, it being understood that changes might well be made in the form of the parts without departing from the invention.

I claim:
1. A film supporting and controlling means comprising in combination a frame, a sprocket wheel rotatably mounted on said frame having a series of teeth thereabout adjacent to one end face, an arm movably mounted on said frame so as to move toward and from said sprocket wheel adapted by engagement with the opposite edge portions of a film to hold the film in engagement with said teeth, and a flat spring member having two notches across its face adapted to have differential latching engagement with said arm for holding the arm releasably in its operative position for pressing a film against the sprocket or alternatively for holding the arm moved away from the sprocket wheel so as to permit removal of the film from the teeth.

2. A film supporting and controlling means comprising in combination a frame, a sprocket wheel rotatably mounted on said frame having a series of teeth thereabout adjacent to one end face, an arm pivotally mounted on said frame so as to swing toward and from said sprocket wheel and arranged in the form of an inwardly open channel whose flanges are shaped to conform substantially to the curvature of the sprocket wheel and arranged to engage the edge portions of a film at opposite ends of the sprocket wheel for holding the film in engagement with the sprocket wheel, a lug projecting from said arm and rounded at its outer end, and a flat spring member having broad notches across its face adapted by engagement with said lug to hold the arm releasably in its operative position for pressing a film against the sprocket or alternatively to hold the arm swung away from the sprocket wheel so as to permit removal of the film from the teeth.

3. A film supporting and controlling means comprising in combination a frame, two sprocket wheels rotatably mounted on said frame in slightly spaced relation to each other in substantially the same plane for engaging a film with a substantial loop portion between the wheels, arms pivotally mounted on said frame so as to extend between said sprocket wheels and so as to be movable toward and from the wheels respectively adapted in operative position to press a film into operative engagement with the wheels, yielding means for holding said arms releasably in position to press against said sprocket wheels, and oppositely disposed lugs on said arms adapted when pressed toward each other to move said arms out of operative position with respect to said sprocket wheels.

PHILMORE F. SPERRY.